Sept. 4, 1928.                                                           1,683,258
H. M. PASSMORE
VARIABLE SPEED TRANSMISSION
Filed April 8, 1927                6 Sheets-Sheet 1

INVENTOR.
Hayes M. Passmore
BY M. C. Frank
ATTORNEY.

Sept. 4, 1928.

H. M. PASSMORE 1,683,258

VARIABLE SPEED TRANSMISSION

Filed April 8, 1927      6 Sheets-Sheet 2

INVENTOR.
Hayes M. Passmore
BY M. C. Frank
ATTORNEY.

Sept. 4, 1928.

H. M. PASSMORE 1,683,258

VARIABLE SPEED TRANSMISSION

Filed April 8, 1927    6 Sheets-Sheet 3

INVENTOR.
Hayes M. Passmore
BY M. C. Frank
ATTORNEY.

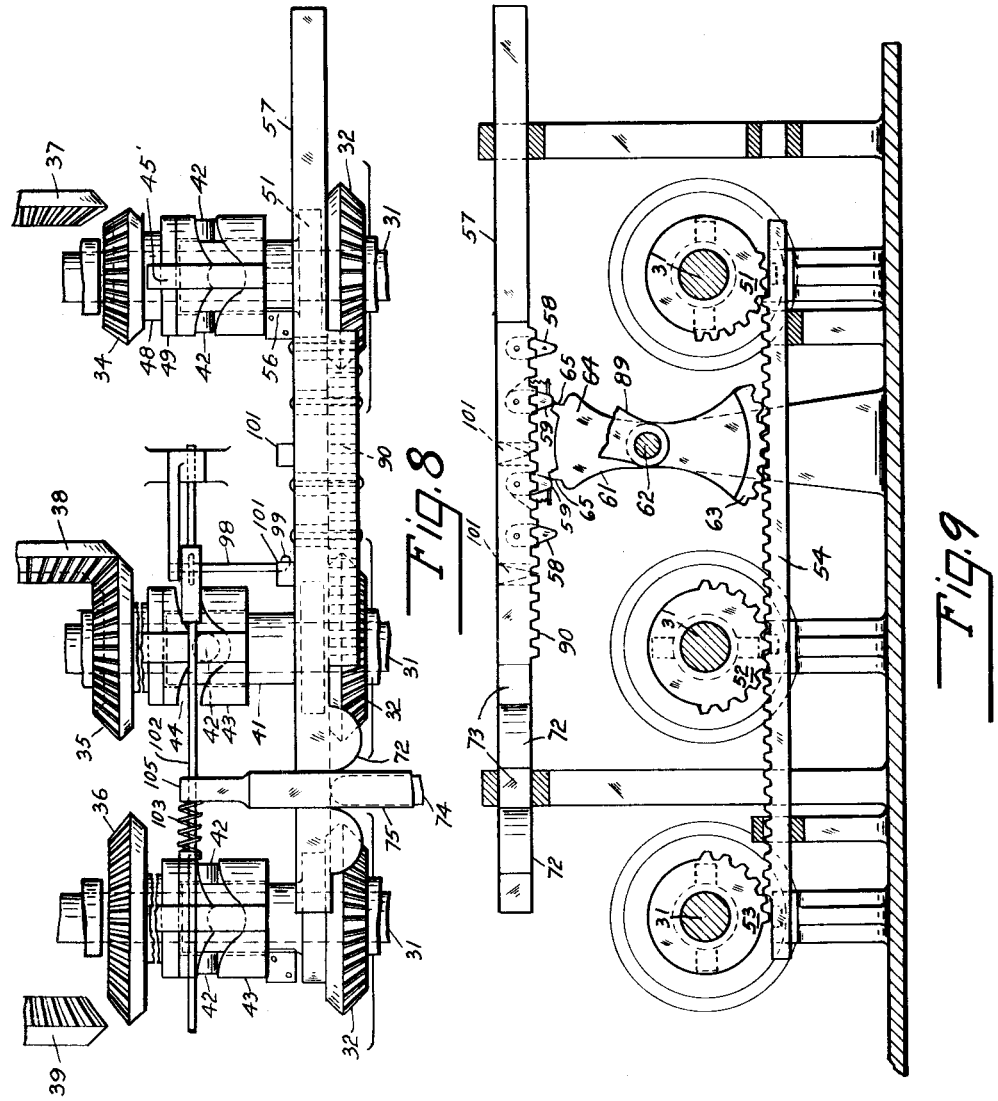

Sept. 4, 1928.
H. M. PASSMORE
1,683,258
VARIABLE SPEED TRANSMISSION
Filed April 8, 1927   6 Sheets-Sheet 5
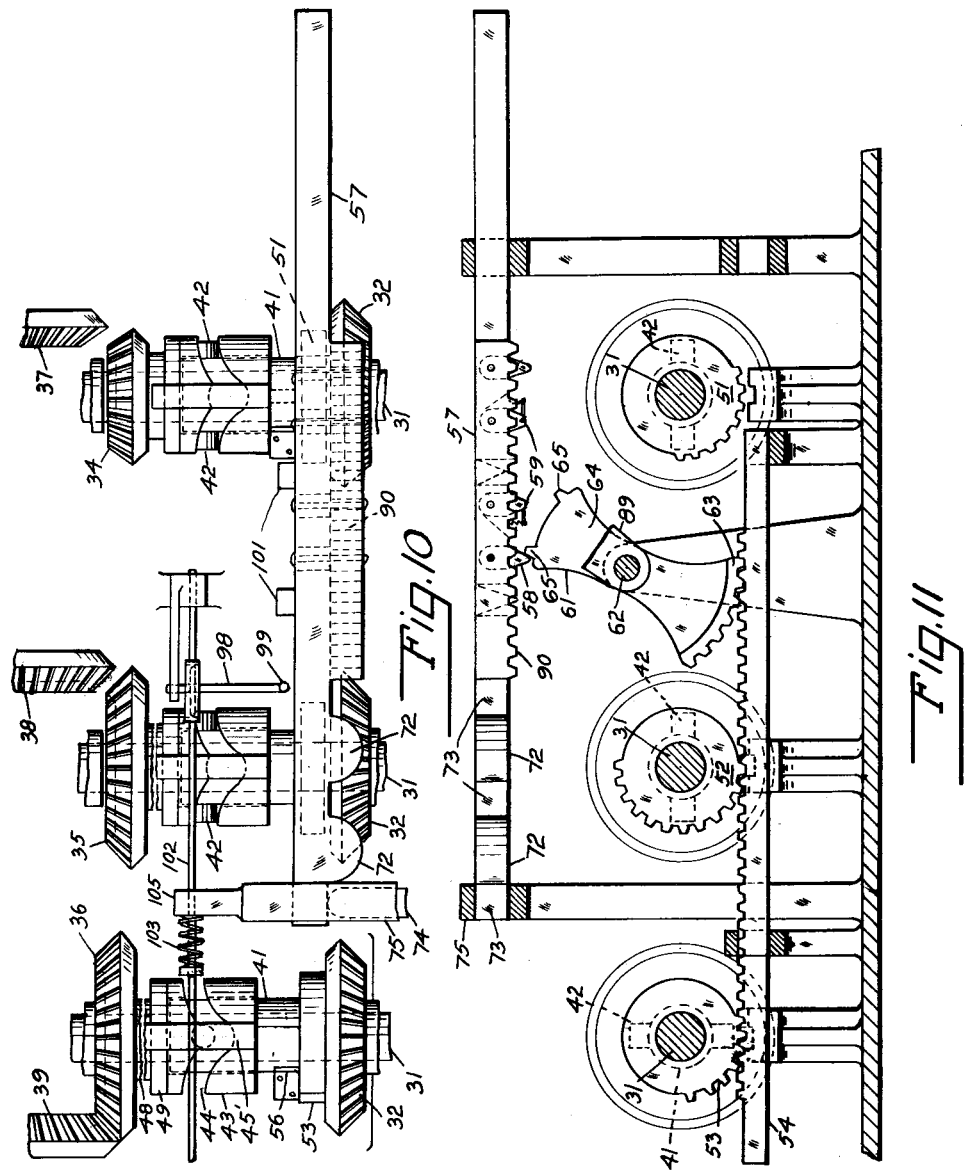
INVENTOR.
Hayes M. Passmore
BY M. C. Frank
ATTORNEY.

Sept. 4, 1928.  1,683,258
H. M. PASSMORE
VARIABLE SPEED TRANSMISSION
Filed April 8, 1927   6 Sheets-Sheet 6
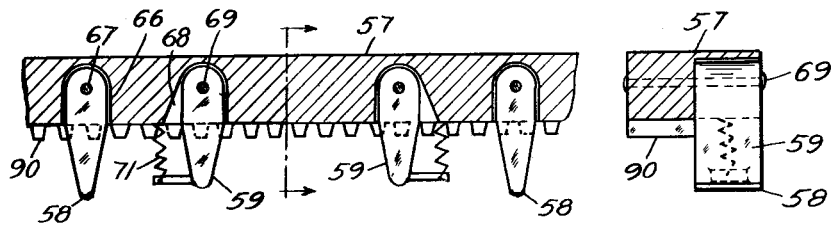
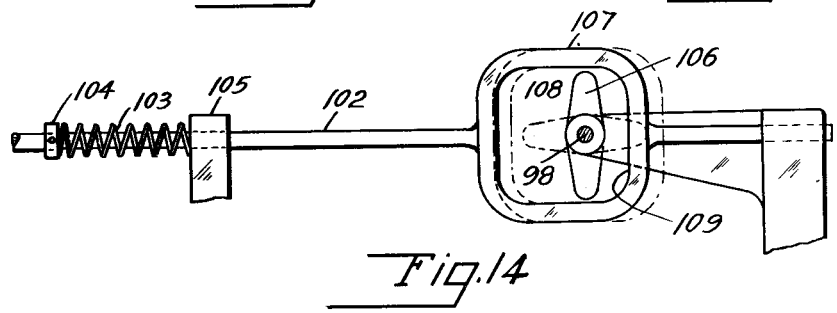
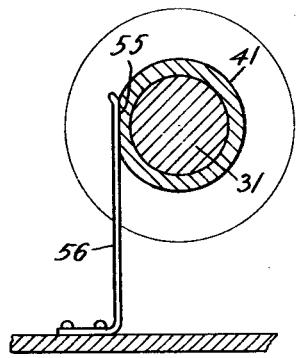
INVENTOR.
Hayes M. Passmore
BY M. C. Frank
ATTORNEY.

Patented Sept. 4, 1928.

1,683,258

UNITED STATES PATENT OFFICE.

HAYES M. PASSMORE, OF OAKLAND, CALIFORNIA.

VARIABLE-SPEED TRANSMISSION.

Application filed April 8, 1927. Serial No. 181,981.

My invention relates to power transmission mechanism providing for different speed ratios between the driven and drive shafts connected thereby, such mechanism being particularly designed for use in self-propelled vehicles.

An object of the invention is to provide transmission mechanism of the class described in which different speed ratios between driven and drive shafts connected thereby will be automatically effected in accordance with the speed of the driven shaft.

Another object of the invention is to provide a transmission of the class described in which the control mechanism is entirely operated by mechanical means.

The invention possesses other objects and features of advantage, some of which, with the foregoing, will be set forth in the following description of the preferred form of the invention which is illustrated in the accompanying drawings, in which, Figure 1 is a plan view of the mechanism, as viewed from the top of the transmission case and with the parts operatively engaged for the lowest ratio of shaft speeds.

Figures 8 and 9 are views similar to Figures 6 and 7 respectively, but with the parts operatively engaged for a second or intermediate speed ratio.

Figures 10 and 11 are views similar to Figures 6 and 7 respectively, but with the parts operatively engaged for the highest speed ratio.

Figures 12 and 13 are enlarged side and transverse sectional views respectively of a portion of the mechanism.

Figures 14 and 15 are enlarged detail views of other portions of the mechanism.

Figure 1:
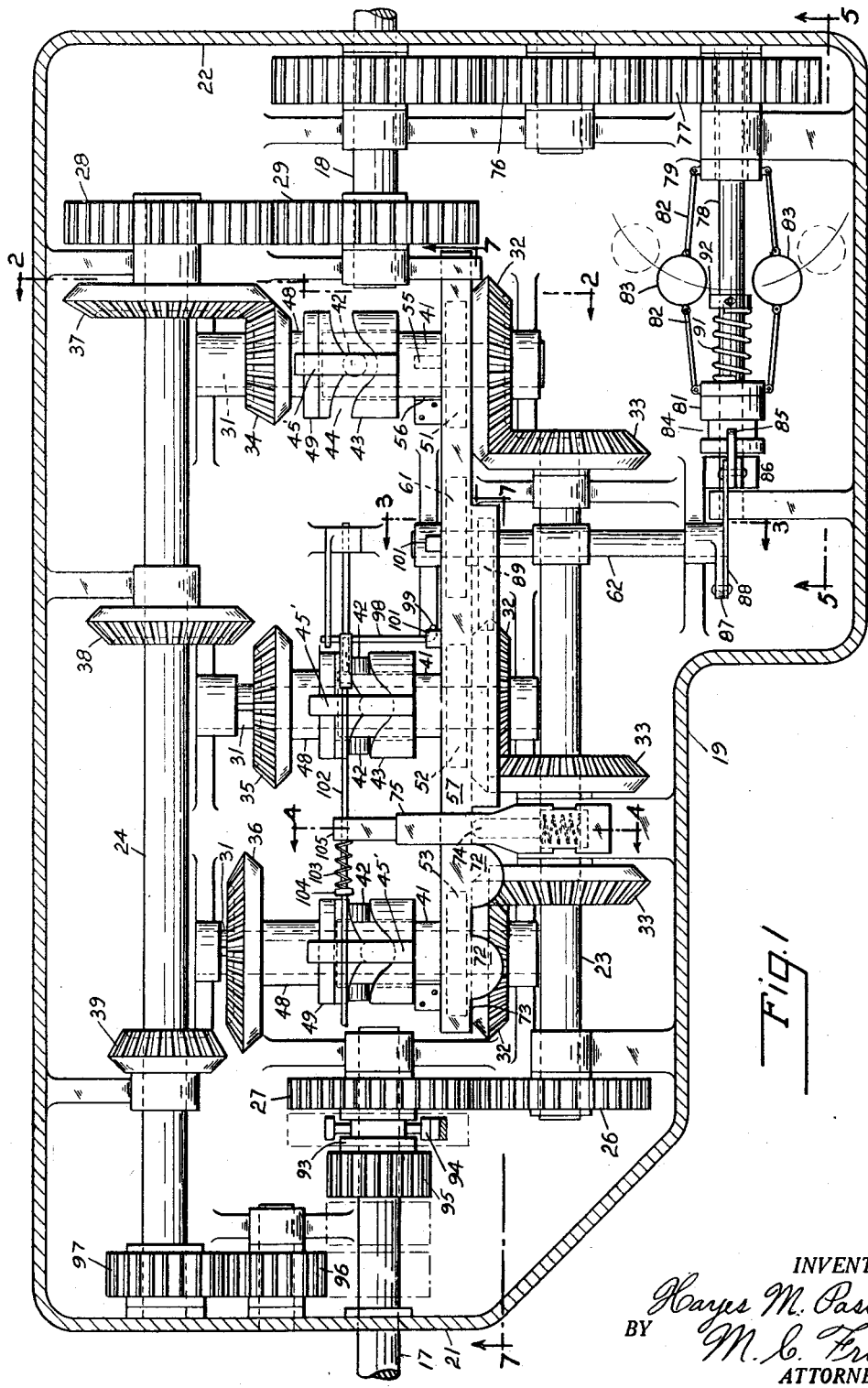

As herewith particularly disclosed, the mechanism of my invention is arranged to effect the transmission of power between aligned drive and driven shafts 17 and 18 extending into a casing 19 through opposed ends 21 and 22 thereof. Suitably mounted in the casing in parallel relation to the axial lines of shafts 17 and 18 are counter-shafts 23 and 24, the former of which is operatively connected to the drive shaft 17 by means of the engagement of a spur gear 26 fixed thereon with a spur gear 27 slidable along the inner end of the shaft 17 and arranged for rotation therewith, while the shaft 24 is operatively connected to the shaft 18 by means of spur gears 28 and 29 fixed to the respective shafts.

Disposed in the plane of the shafts 23 and 24 to extend transversely between such shafts are revoluble cross-shafts 31, here shown three in number. The shafts 31 are each operatively connected to the shaft 23 by means of cooperating bevel gears 32 and 33 mounted respectively on the shafts 31 and 23 whereby the rotation of shaft 23 will effect corresponding rotations of the different shafts 31. Mounted on the ends of the different shafts 31 adjacent shaft 24 are bevel gears 34, 35, and 36, such gears being splined to their shafts for movement therealong. The shaft 24, it will now be noted, is provided with bevel gears 37, 38 and 39 fixed thereto and so disposed with respect to the gears 34, 35 and 36 respectively that the latter may be individually engaged by the former.

It will now be noted that the transmission of power between the shafts 17 and 18 is designed to be effected at different rotative ratios of the shafts, and that the different ratios are provided for in the gear trains associated with the different shafts 31. Preferably, and as here shown, the different ratios are determined as between the movable gears 34, 35 and 36 and the cooperating gears 37, 38 and 39 on shaft 24.

Accordingly gears 34, 35 and 36 are made progressively larger in their order, while gears 37, 38 and 39 are progressively smaller in their order, it being noted, however, that not more than one cooperating pair of these gears may be engaged at a given time and that the shaft 24 is arranged to be rotated in the same direction by each train of gears. In this manner, the ratio of the speed of shaft 18 to that of shaft 17 will be least when gears 34 and 37 are meshed, somewhat greater when gears 35 and 38 are meshed, and greatest when gears 36 and 39 are meshed, these ratios corresponding in order to the low, intermediate and high speed ratios of standard automobile transmissions and being preferably made to conform in value thereto when the present apparatus is to be used for similar purposes.

Figure 2:
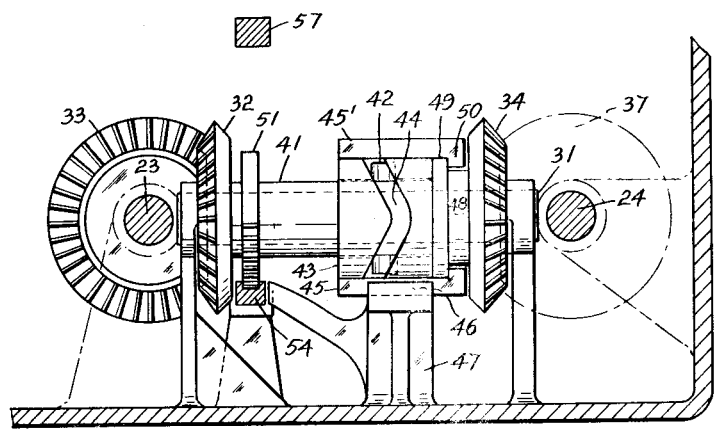
Figure 2 is a fragmentary elevation taken substantially on the line 2—2 in Figure 1.
Figures 3, 4:
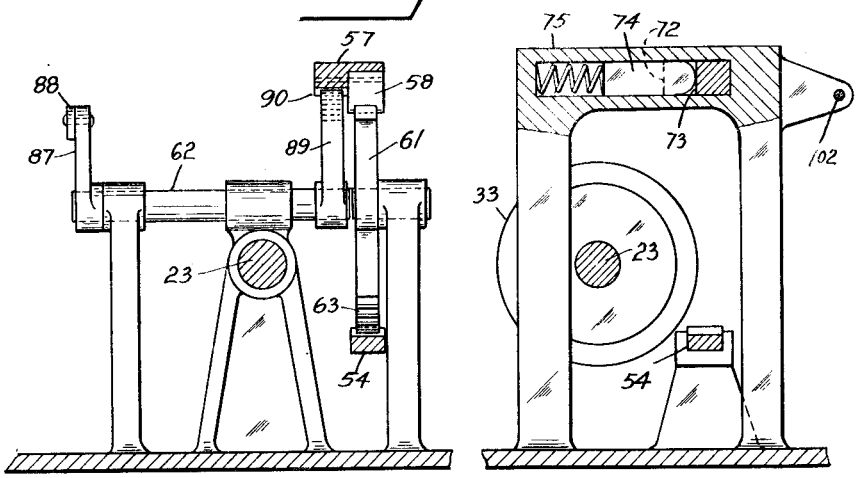
Figure 3 is a fragmentary elevation taken on the line 3—3 in Figure 1.
Figure 4 is a fragmentary elevation taken on the line 4—4 in Figure 1.

Since at any one time but one of the shafts 31 may be operatively connected to the shaft 24, and since it may be desirable to shift the operative connection from one of such shafts to another while shafts 17 and 18 are rotating, means are provided for selectively controlling and shifting such connections. The shafts 31, it will now be noted, are each journalled at their extremities beyond the gears carried thereby, while mounted thereon for rotation relative thereto are like sleeves 41 each having extending therefrom in opposed relation, and adjacent their forward ends pins 42. Loosely mounted on the sleeves 41 are collar members 43, such members being provided with zig-zag grooves 44 therearound in which the pins 42 are engaged. The members 43 are prevented from rotating by reason of the engagement of longitudinal fins 45 provided thereon in slots 46 formed in projections 47 Fig. 2, extending upwardly from the bottom of the casing. When, as here shown, the members 43 are formed in two sections, the fin 45 is also utilized to secure said sections together, and at least one additional fin 45' is preferably provided at the opposite side of the member for the same purpose.

The hubs 48 of the different sliding gears 34, 35 and 36 are each provided at their inner ends with annular flanges 49, while extending from the fins 45 to engage the forward sides of the flanges 49 are fingers 50 whereby the flanges will always be retained between the fingers and their sleeves. The grooves 44, it will now be noted, are so shaped and related to the pins 42 and members 43 that when the pins 42 are longitudinally disposed, the sliding gears will be held out of engagement with the cooperating gears on the shaft 24, while with the pins vertically disposed, the gears will be held in mesh. In this manner, it will be clear that a quarter turn of a given sleeve 41 is sufficient to engage or disengage the sliding gear associated therewith with the opposed gear of shaft 24. Means are accordingly provided for effecting the appropriate rotations of the sleeves 41 to effect the engagement of a given sliding gear with its cooperating gear on the shaft 24 and at the same time positively prevent the engagement of either of the other sliding gears. As here shown, gears 51, 52 and 53, of like diameter are mounted on each of the different sleeves 41, and all of said gears are arranged for engagement with a rack 54 disposed below them and mounted for longitudinal reciprocation in a fixed path.

It will now be noted that the device is normally connected in low gear with gears 34 and 37 meshed, such condition being particularly disclosed in Figures 1, 2, 6 and 7. Under these conditions, the pins 42 are vertically disposed and the rack is at one extremity of its travel with its teeth engaged with the gear 51 which is associated with the low speed cross-shaft 31. With the rack in this position, it will be noted that the pins 42 of the other sleeves are arranged to be horizontal, and that the rack teeth are entirely out of engagement with the gear 53. As the rack is shifted toward the gear 53 sufficiently to effect a 90 degree rotation of the gear 52 to cause the engagement of the intermediate gear 35 with the gear 38, the gear 51 rotates its sleeve to release the low gear connection, it being noted that when the gears 35 and 38 are operatively meshed, only the extreme end teeth of the rack engage the gears 51 and 53, Fig. 9. Further movement of the rack toward the gear 53 to effect a 90 degree rotation of this gear will further rotate the gear 52 to release gear 35 from its engagement with gear 38, will at the same time effect an engagement of gear 36 with gear 39, Figs. 10 and 11, and will not move the gear 51, since, in the latter case the rack is operatively clear of the gear. In this manner, the selective shifting of the gears 34, 35 and 36 is arranged to be controlled entirely by the positioning of the gear rack 54 with respect to the control gears 51, 52, and 53, it being noted that only one of the former gears is arranged to be meshed with its gear on shaft 24 at any time.

Since, at certain times, gears 51 and 53 and their associated parts are not held in fixed position by the rack, means are preferably provided for holding them in the positions they assume when the rack becomes disengaged from them. As here shown, the sleeves 41 of these gears are provided with flat bearing surfaces 55, Fig. 15, against which leaf springs 56 are arranged to bear whereby a sufficient resilient resistance is offered to the displacement of the sleeves to urge and insure their proper disposition when they are not engaged by the rack. Since gears 51 and 53 are oscillated through only 90 degrees at any time and gear 52 is oscillated through only 180 degrees, these gears may be segmentary, as is herewith particularly disclosed.

Means are provided for effecting the shifting of the rack 54 between its various positions, such means preferably being arranged to effect each shifting movement with comparative rapidity whereby "grinding" of the gears to be meshed may be avoided. As here shown, the shifting means comprises a bar member 57 mounted above, and in parallel relation to the rack 54 for longitudinal reciprocation and having longitudinally aligned and downwardly extending teeth on the lower side thereof, such teeth being four in number and comprising a pair of relatively fixed outer teeth 58 and a pair of pivotally displaceable inner teeth 59. Operative connection between the bar 57 and rack 54 is effected through a member 61 mounted for free rotation about a shaft 62 disposed between the bar and rack and extending transversely of their plane. The member 61, it will be noted, is provided with a segmental gear portion 63 arranged for engagement with the teeth of the rack 54, while a portion 64 of the member diametrically related to the gear portion 63 is provided with a pair of spaced teeth 65 which are arranged to be variously engaged with the teeth 58 and 59 of the bar 57, it being noted that a given movement of the bar 57 will, with the present arrangement of parts, effect an opposite movement of the rack 54.

Referring now more particularly to the teeth 58 and 59, it will be noted that the former are disposed in downwardly directed sockets 66, Fig. 12, provided in the bar 57 and are held therein by means of pins 67, the fitting of these teeth in their sockets being such that they are held in fixed position therein. The inner teeth 59 are secured in sockets 68 by means of pins 69, but the sockets 68 are shaped to permit a rotative deflection of the teeth from the vertical toward the adjacent teeth 58. The teeth 59 are preferably arranged to be normally held disposed vertically, and as here shown, such disposition thereof is arranged to be effected by means of compression springs 71 operatively interposed between them and the bar 57.

It will now be noted that when, as shown in Figure 9, the apparatus is set in intermediate, or second gear, the member 61 is vertically disposed and the teeth 65 thereof are arranged to lie between and adjacent the bar teeth 59 but without causing the deflection thereof. If now, the bar 57 be displaced in either direction, the tooth 59 against which a tooth 65 is moved is deflected to pass over the latter, so that no movement of the member 61 is effected by such contact. The continued movement of the bar 57 will, however, thereafter bring a fixed tooth 58 against the same tooth 65 to thereby effect an angular displacement of the member 61 and so of rack 54 until the desired extreme movement of the latter to either the low or high gear positions thereof has been effected, at which time the further movement of the bar 57 is arranged to cease, it being noted that at such time the engaged tooth 65 is preferably disposed vertically above the pivotal axis of shaft 62 whereby it will lie as close as possible to the bar 57. When a shift of the bar 57 to effect an intermediate gear setting from one of the other settings is made, the bar will move freely until a tooth 59 engages the tooth 65 disposed in its path, whereupon the member 61 will be rotated until the tooth 59 can override the tooth 65 and the previously described intermediate setting of the apparatus is effected, it being noted that the springs 56 bearing on the gear shift sleeves 41 function through the rack 54 to insure the proper final disposition of the member 61 as for the intermediate position thereof.

It will now be noted that with the present structure, the bar teeth 58 extend further downwardly than do the teeth 59 and that the spacing relation of these teeth are such as will permit the operations described. The foregoing relations for the low and high gear settings, it is noted, are particularly disclosed in Figures 7 and 11 respectively.

Protruding from a side of the bar 57 is a pair of extensions 72, such extensions being of generally cylindrical outline and having defined between them and at opposite sides thereof seats 73 for the reception of the free extremity of a spring pressed detent member 74 disposed for projection against the bar and carried in a fixed mounting 75. The relation of the detent to the bar is such that when the bar is disposed for an intermediate-gear setting the detent will be engaged in the central seat, while for the other settings, it will be disposed in one of the end seats. During the considerable part of a gear changing movement of the bar which precedes the rotation of the member 61 thereby, one of the extensions 72 will be forced under the detent and be so disposed with respect thereto when the movement of the member 61 is effected that the detent will have passed over the crown of the extension which it engages and in moving into its new seat will assist in effecting the gear shifting process. It will, of course, be obvious that no less important function of the detent means now described is to effect a resistance to the shifting of the bar 57 whereby it may resist displacement from any one of its set positions.

Figure 5:
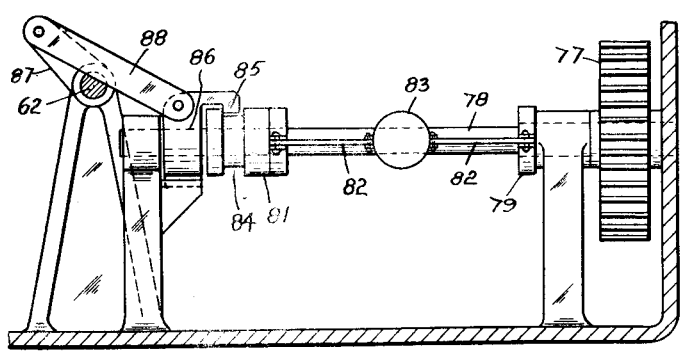
Figure 5 is a fragmentary elevation taken on the line 5—5 in Figure 1.
Figure 6:
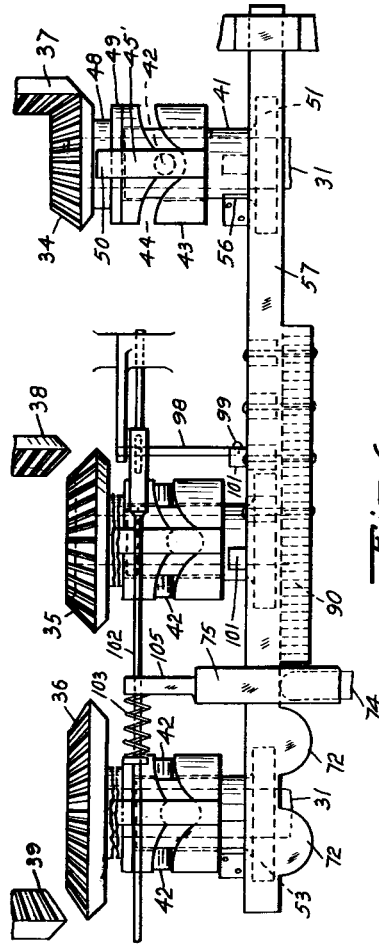
Figure 6 is a view of a portion of the showing of Figure 1.
Figure 7:
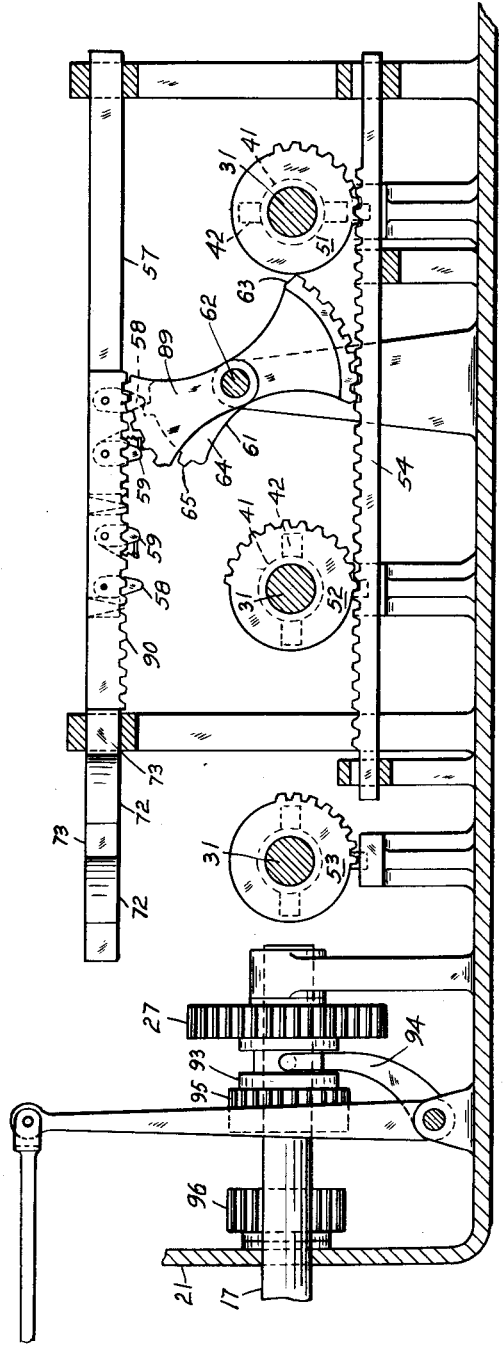
Figure 7 is a fragmentary elevation taken on the line 7—7 in Figure 1.

It will now be clear that the control of the apparatus is arranged to be effected through the reciprocative displacement of the bar 57, and that such bar may be manipulated in any suitable manner. However, as has been hereinbefore indicated, the shifting of gears is arranged to be automatically effected in accordance with the rotative speed of the driven shaft 18, and control means operatively associated with such shaft are accordingly provided. Suitably geared to the shaft 18 by means of gears 76 and 77 and preferably disposed within the casing 19 is a governor shaft 78, such shaft being disposed in parallel relation to the shaft 18. Mounted on the shaft 78 at spaced points therealong are sleeves 79 and 81, Figs. 1 and 5, the former being fixed to the shaft and the latter being arranged for slidable movement along the shaft, and each of said sleeves being connected by means of pivoted links 82 to fly balls 83. The sleeve 81, it will be noted, is provided with an annular groove 84 at the outer end thereof in which a finger 85 extending from a loose collar 86 carried in the shaft adjacent the collar 81 is arranged to engage. The collar 86 is held against rotation and is slidable along the shaft in accordance with the positioning of the sleeve 81 thereon.

The shaft 62 is provided with a crank arm 87, which arm is connected to the collar 86 by means of a link 88 whereby the movement of the sleeve 81 by reason of the rotation of the governor will effect a rotation of the shaft 62. Mounted on the shaft 62 is a segmental gear 89, which gear is arranged to engage with a rack 90 provided on the bar 57 adjacent the teeth 58 and 59 thereof. It will now be noted that when the shaft 18 rotates, the fly balls of the governor tend to move outwardly of the shaft and so draw the sleeve 81 inwardly to thereby effect a rotative displacement of the shaft 62. But such rotation of shaft 62 is resisted by the action of the detent 74 on bar 57 as well as of the governor spring 91, so that a movement of the bar 57 to set the apparatus for a higher gear ratio is not effected until the governor speed is sufficient to generate sufficient pull on the crank arm 87 to overcome this resistance, whereupon a shift of gears to the higher ratio will be automatically effected, it being noted that the shifts from low to intermediate, or from intermediate to high, are thus controlled directly by the fly ball pull. Assuming the gears set at one of the higher ratios, when the rotative speed of the shaft decreases sufficiently, the force of the governor spring 91 is arranged to overcome the resistance offered by the detent 74 and other portions of the mechanism, to shift the gear connection to a lower ratio, it being noted that the automatic shifting from a given ratio to a lower one occurs at a slightly lower speed of shaft 18 than does that from the lower to the higher ratio. Preferably, the spring 91 is disposed between the governor sleeve 81 and a sleeve 92 arranged to be adjustably set along the shaft 78 whereby the speeds at which the gear shifts will be effected may be adjustably varied.

In the present embodiment of the invention, the device is particularly arranged as for use in the transmission of power in a self propelled vehicle. Accordingly, the gear 27 is mounted on a sleeve 93 splined to the shaft 17 and arranged to be moved therealong by means of a fork 94 engaging it, whereby the gear 27 may be engaged or disengaged from the gear 26. Means are also preferably provided for effecting a reverse rotation of the shaft 18, and as here shown, such means comprises a gear 95 mounted on the sleeve 93 and arranged when the gear 27 is freed from the gear 26, to be placed in engagement with an idle gear 96 which in turn engages a gear 97 fixed on the counter shaft 24. Preferably, the sleeve 93 is arranged to be placed in an intermediate position with neither of the gears 27 or 95 in mesh whereby a neutral or inopeartive setting of the apparatus may be made. The fork, it will be noted, is arranged to be operated from the operator's station in a suitable manner. Since in effecting a gear shift, it is desirable that the transmitted power be lessened at the instant of shifting, means are provided for automatically decreasing the power at such time. Mounted in the casing to extend perpendicularly of the bar 57 is a cam shaft 98, Fig. 14, having a trigger or finger 99, Fig. 1, extending laterally therefrom, and disposed for engagement with one or the other of a pair of projections 101 of the bar 57, each time a shifting movement of the bar is effected. The finger 99 is normally disposed vertically, and when struck by a projection 101 is arranged to be deflected by the projection to a position to move by the latter, in this manner, the finger may be equally deflected by a projection 101 moved against it from either side and is freed from such deflections to return to its normal position. The rotation of the shaft 98 thus effected is utilized to effect an appropriate movement of a longitudinally reciprocable power control rod 102. As here shown, the rod 102 is arranged to be resiliently urged to maintain a fixed inoperative position by means of a spring 103 disposed thereon and operatively interposed between a collar 104 on the rod and a fixed spring seat member 105. Fixedly mounted on the shaft 98 is a cam member 106 having diametrically related points, the line of such points being normally perpendicular to the rod 102. A portion 107 of the rod 102 is formed to define a hollow space 108 disposed in the plane of movement of the cam 106 and presenting a bearing face 109 at the side thereof furthest from the spring 103, whereby when the cam is rotated in either of the possible directions, one of its points will so engage the face 109 as to cause a longitudinal displacement of the rod against the resistance of spring 103.

It will now be noted that the relation of the projections 101 to the finger 99 is such that the rod 102 is displaced as the gear shift occurs, and that, when the device is used with an internal combustion engine, the rod is preferably connected to the fuel control mechanism (not shown) to lessen the fuel supply at the time of shift.

It will be noted that with the transmission mechanism now described installed in a motor vehicle, the operator in starting from rest would first throw out the clutch, engage gears 26 and 27, and thereafter release the clutch, whereby the device is placed in low gear. As the speed of the vehicle increases, and so of shaft 18, the shift to intermediate and high gear would occur automatically in the manner indicated, whereas, if the vehicle slows down, the shifts to a lower gear connection would be automatically effected so that the power of the engine will always be applied in the most advantageous manner. To use the compression of an internal engine for braking purposes for a vehicle, it is merely necessary that the vehicle be slowed down to a speed for effecting the shift into intermediate or low gear, it being noted that an undue forced "racing" of the engine under these circumstances is rendered impossible.

I claim:

1. In a device of the character described, drive and driven shafts, a plurality of intermediate shafts operatively connected to one of said first shafts, fixed gears on the other of said first shafts, gears splined to each of said intermediate shafts and movable therealong for engagement with different of said first gears, and means mechanically controlling the positioning of said movable gears on said intermediate shafts and directly operative to prevent the engagement of more than one of said movable gears with the co-operating gear of said first gears.

2. In a device of the character described, drive and driven shafts, a plurality of intermediate shafts operatively connected to one of said first shafts, gears fixed on the other of said first shafts, gears splined to each of said intermediate shafts and movable therealong for engagement with different of said first gears, and automatic selector means controlled by the rotative speed of said driven shaft and directly operative to selectively engage one of said last gears with the cooperating one of said first gears.

3. In a device of the character described, a drive shaft, a driven shaft, a plurality of intermediate shafts, gear means operative to provide independent operative connections through said intermediate shafts between said drive and driven shafts to effect different speed relations therebetween, and a gear shift mechanism operative entirely mechanically to effect a change of said connections to a different intermediate shaft in accordance with the speed of the driven shaft.

4. In a device of the character described, a drive shaft, a driven shaft, a plurality of intermediate shafts operatively connected to one of said first shafts, means operative to independently connect different of said intermediate shafts to the other of said first shafts at different speeds of said driven shaft, means operated by said driven shaft to change said connections in accordance with the speed of said driven shaft, and means yieldingly resisting the operation of said first means whereby said changes will occur only at predetermined speeds of said driven shaft.

5. In a device of the class described, drive and driven shafts, a plurality of intermediate shafts each arranged to provide independent geared connections between said first shafts, a common member operatively associated with all of said intermediate shafts and operatively disposable to selectively establish a geared connection between said first shafts through one of said intermediate shafts, a governor mechanism operated from said driven shaft, a second member variously disposable by said governor in accordance with different rotative speed ranges of said driven shaft, and geared connections between said members whereby the positioning of said first member is controlled in accordance with that of the second member.

6. In a device of the character described, drive and driven shafts, gearing means arranged to provide different and independent geared connections between said shafts corresponding to different rotative speed ranges of said driven shaft, a member arranged to be disposed in a plurality of positions and operative against said gearing means when in any one of said positions to selectively set said gearing to effect different of said geared connections between the shafts, a second member operatively associated with said driven shaft and arranged to be variously disposable in accordance with different rotative speed ranges of said driven shaft, and geared connections between said members whereby the disposal of said second member will determine that of the first member, said last geared connections permitting ranges of movement of said second member corresponding to said speed ranges of said driven shaft without effecting a displacement of said first member.

7. In a device of the class described, drive and driven shafts, a plurality of intermediate shafts arranged for independent geared connections to said first shafts, a common selector member operatively associated with all of said intermediate shafts and operable entirely mechanically to establish a geared connection through one of said last shafts between said first shafts and to positively prevent a geared connection of other of said last shafts between said first shafts, and means automatically operable in accordance with the rotative speed of said driven shaft for selectively disposing said selector member.

8. In a device of the class described, drive and driven shafts, a plurality of intermediate shafts arranged for independent geared connections to said first shafts, a selector member operatively associated with all of said intermediate shafts and operatively disposable to establish a geared connection between said first shafts through said last shafts and to simultaneously prevent a geared connection between said first shafts and the other of said last shafts, and governor means operated by said driven shaft automatically operable to dispose said selector member in accordance with the speed of said driven shaft.

9. In a device of the character described, a drive shaft, a driven shaft, a plurality of intermediate shafts, gear means independently operable for connecting said intermediate shafts to said drive and driven shafts, a member operatively associated with all of said gear means and variably disposable to mechanically effect through an appropriate one of said gear means the operative connection of different intermediate shafts to said drive and driven shafts, and means automatically operable upon a change of speed of said driven shaft to operatively connect a different one of said intermediate shafts between said drive and driven shafts.

In testimony whereof I affix my signature.

HAYES M. PASSMORE.